May 12, 1970     J. L. DUNN, JR     3,510,954
SOLVENT REMOVAL
Filed April 10, 1968     2 Sheets-Sheet 2
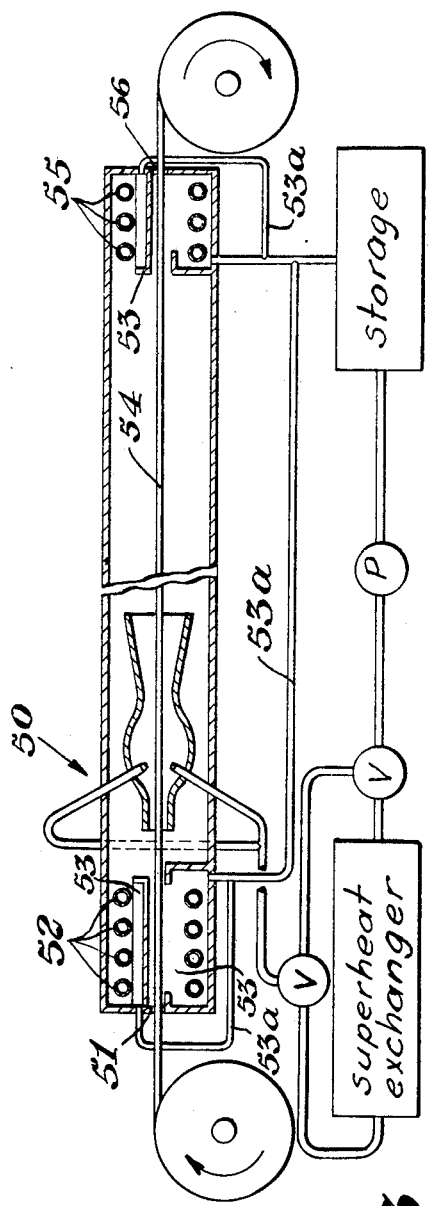
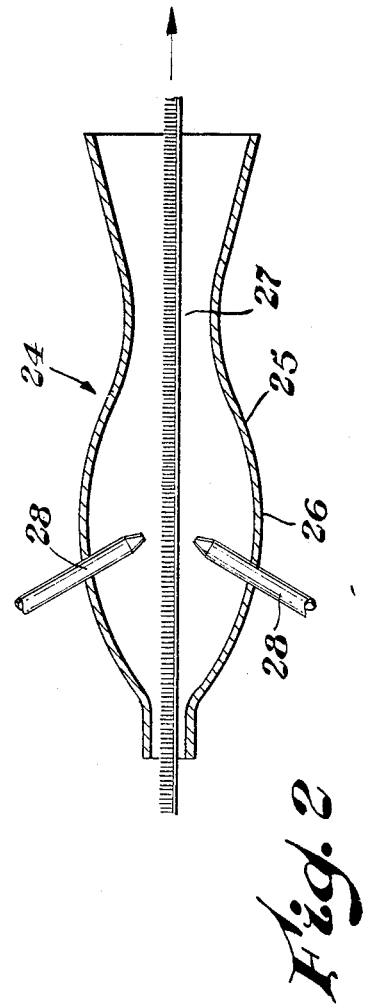
INVENTOR.
James L. Dunn, Jr.
BY
ATTORNEY United States Patent Office 3,510,954
Patented May 12, 1970

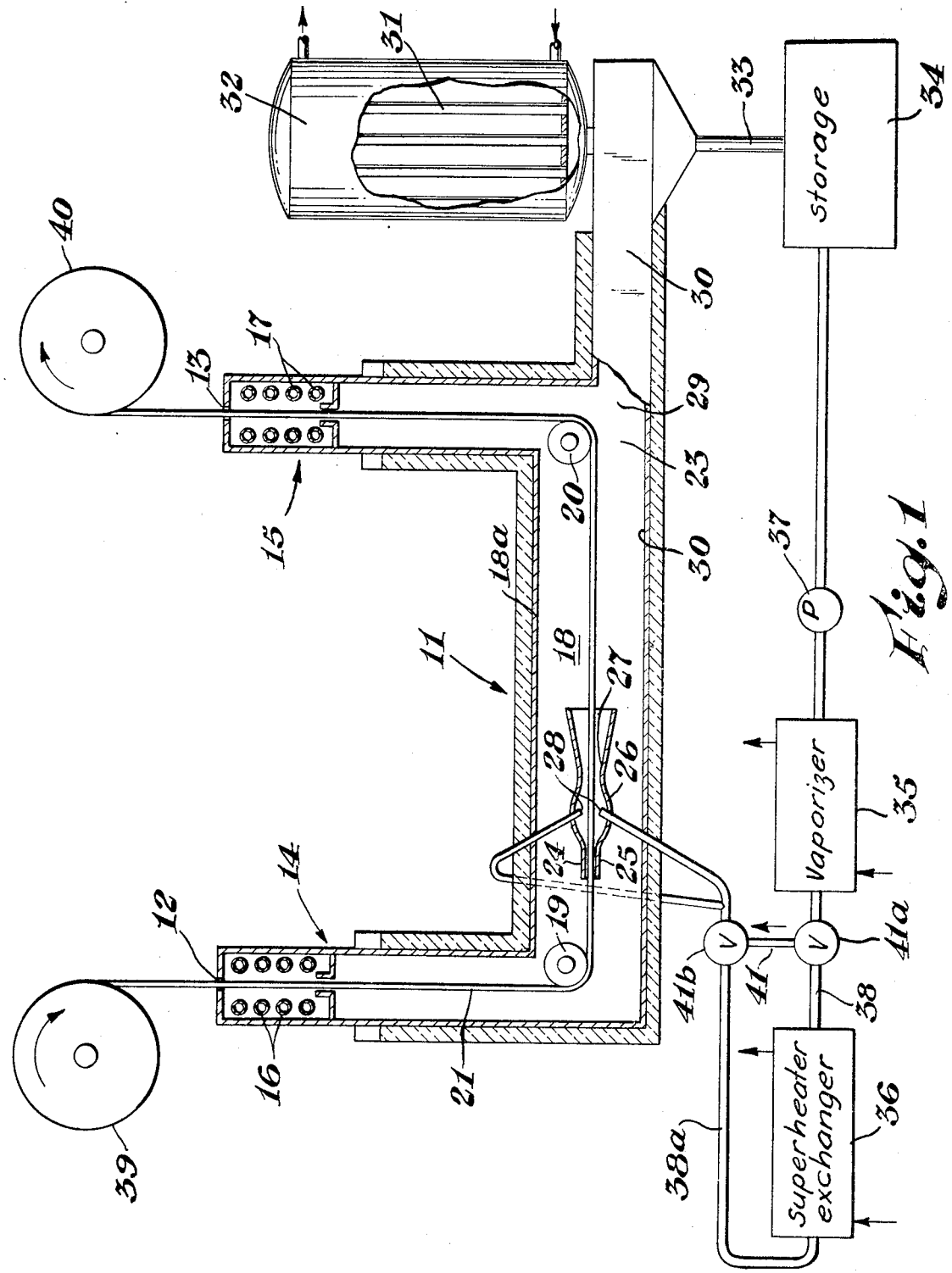

3,510,954
SOLVENT REMOVAL
James L. Dunn, Jr., Lake Jackson, Tex., assignor to The Dow Chemical Company, Midland, Mich., a corporation of Delaware
Filed Apr. 10, 1968, Ser. No. 720,257
Int. Cl. F26b 3/04
U.S. Cl. 34—22      5 Claims

ABSTRACT OF THE DISCLOSURE

A method for removing vapors from a base material which comprises introducing the base material, which retains a vaporizable organic liquid therein, into a zone containing vapors of the organic liquid, introducing the base material into a confined zone, impinging a high-velocity jet stream of superheated vapor of said organic liquid onto the base material while within said confined zone; moving the base material from said confined zone into the surrounding vaporous atmosphere which is maintained at a temperature at least that equal to the boiling point of the liquid from which the vapors are generated; and, finally removing the base material from the so-maintained atmosphere. The apparatus for conducting the method of the present invention is also described and claimed.

BACKGROUND OF THE INVENTION

The field of treating textiles, woven fabrics, carpets, paper, webs and films and complicated shaped parts is an old and well-established art. The methods for treating these materials have changed little over the years. Water is the most common carrier for the agent employed in the treatment of such materials. The removal of the water retained in such treated materials has always been expensive and time consuming. The time and expense generally are attributed to the physical introduction of heat to the materials to remove the water. Since it is difficult to establish high temperature differentials between the fabric and the drying source without damaging the material, particularly, fabric, paper or the like, the factor of time is greatly increased. Thus temperatures near the boiling point of water are employed by introducing moderately superheated steam or air at temperatures only slightly above the boiling point of the carrier, usually water.

In treating complicated shapes such as degreasing metal or plastic parts, like problems are encountered in removing the solvents employed from deep recesses without inordinate periods at elevated temperatures.

It is an object of the present invention to provide a process for removal of volatilizable carriers and solvents from a base material which has been treated with an agent contained in the liquid form of the volatilizable carrier or solvent or the solvent per se (solvent which condenses in part) as in degreasing.

BRIEF DESCRIPTION OF THE INVENTION

In accordance with the present invention, a base material, e.g., a metal or plastic part, particularly those having deep recesses, a fabric, particularly one having a heavy nap or a paper sheet or web, is treated with an agent, such as a stain repellent, dye or coating composition from a volatilizable solvent carrier or merely the solvent to remove grease, etc. The material so treated is passed into a zone of vapors of the solvent, then into a zone wherein a jet stream of high-velocity superheated vapors of the solvent is impinged onto and into the material. The preferred manner of operation is to employ pairs of jets diametrically opposed to obtain maximum penetration of the superheated vapors into the center of the material, such as a fabric, provided the base material is equally penetrable from each side, and/or into the recesses of the shaped parts.

In a preferred embodiment, the part, fabric or web, and superheated vapors passes into and through a chamber, whose cross section is venturi shaped in which the jets are located and then back into the zone of vapors. The fabric, or part, now heated to the boiling point of the solvent it retained, passes out of the vapor zone free of solvent.

One apparatus for carrying out the process of the present invention is illustrated in the drawings:

FIG. 1 represents a sectional elevation of an apparatus suitable for carrying out the present invention.

FIG. 2 represents an exploded cross-sectional view of one mode of arrangement for obtaining the desired venturi effect in the present invention.

FIG. 3 represents a modified embodiment wherein horizontal orientation is necessary or preferred.

One embodiment of a preferred design for an apparatus suitable to carry out the present invention is shown in FIG. 1, which essentially comprises a U-shaped duct 11 having openings 12 and 13 in the upper extent of vertical sections 14 and 15 of the generally U-shaped duct 11. Each section 14 and 15 has near the openings 12 and 13, a series of cooling coils 16 and 17 respectively. These cooling coils 16 and 17 are connected with piping (not shown) to an external cooling source such as cold water. Within the horizontal section 18 of duct 11 are a pair of guide rollers 19 and 20 which are positioned to guide a web or sheet 21 thus establishing a path from the opening 12 through the vertical section into the horizontal section 18 thence out the vertical section 15 through opening 13.

Within horizontal section 18 centered along the path of the web or sheet 21 and extending completely across the horizontal section 18 is placed a pair of plates 24 and 25 which define, in cross section, a venturi-like chamber having an expanded section 26 and a constricted throat 27. Within the expanded section 26 are placed series of jets 28 positioned to direct their output against the part, fabric, paper or the like 21 across the entire width. Tubing or piping is used to supply the superheated vapors to all of the said jets 28.

At the end 23 of horizontal portion 18 near the vertical section 15 is an opening 29 and duct work 30 which connect the interior of the duct 11 with a vapor condensing means 31. The condensing means 31 is positioned so that its vapor level 32 is below openings 12 and 13 yet above the roof 18A of horizontal portion 18.

The condensing means 31 has a drain 33 for directing solvent condensed within the condensing means to a storage tank 34. The storage tank 34 is connected to a pump 37 to move the condensed solvent to a vaporizer 35, wherein the solvent from storage tank 34 is vaporized.

Piping 38 and 38A connects vaporizer 35 through superheater 36 to the jets 28. Alternatively vaporizer 35 is connected to the jets 28 by pipe 41 through 3-way valves 41A and 41B. The alternate path, by-passing the superheater 36, is used when the solvent vapor from the vaporizer 35 creates its own superheat due to a lowering of pressure by expansion at the jets 28.

Feed roll 39 and takeup roll 40 are positioned outside the apparatus to provide storage for the web before introduction and after solvent removal.

An alternative apparatus for carrying out the process of the present invention is illustrated in FIG. 3. This apparatus is designed for horizontal orientation, thereby to make the apparatus easily accessible from single elevation.

The apparatus consists of an elongated enclosure 50 having an inlet opening 51 at one end provided with cooling coils 52 within the interior and adjacent to the inlet opening 51. Associated with said coils 52 are collection troughs 53 which are shown as walled-off portions adjacent the opening 51 but may be a small depression or sump of a sufficient depth to contain the condensate from the coils 52. Associated with the collection throughs 53 are lines 53A for draining troughs 53. Condensing surfaces 55 define an outlet opening 56 of the enclosure 50 through which the treated material 54 can pass out of the apparatus. The condensing surfaces 55, having associated therewith collection troughs 53 drained by lines 53A, should be of sufficient size to maintain the vapors removed from the material being treated and the vapors introduced into the apparatus from escaping. While this device has been described generally as a horizontally oriented unit, it is to be understood that it can be oriented in a vertical manner with but minor changes to drains and troughs.

I claim:

1. A method for removing a volatile solvent from a web, sheet or film which comprises:
   (a) passing the fabric into an enclosure containing superheated vapors of the volatile solvents;
   (b) passing the fabric into a confined zone which has jets of high-velocity superheated vapors which impinge onto and into the fabric, said zone being restricted at the entrance, expanded in the area of the jets and restricted at the exit of the zone in a flaring throat shape;
   (c) passing the fabric from the throat into an apparent lower pressure zone; and,
   (d) withdrawing said fabric from said enclosure free of solvent vapors.

2. An apparatus for removing solvent vapors from a fabric having a nap which comprises:
   (a) a generally U-shaped enclosure having a fabric inlet and a fabric outlet respectively in the legs of said enclosure;
   (b) cooling coils within said enclosure adjacent the enclosure inlet and outlet;
   (c) a means for directing the path of said fabric through said enclosure;
   (d) a generally venturi shaped chamber with said enclosure through which fabric can pass in its path through the enclosure;
   (e) a means within said chamber capable of generating a high-velocity stream of a superheated vaporous material and means for directing the so-generated stream against the fabric from each side of the fabric;
   (f) a means for generating a vapor from a vaporizable solvent;
   (g) a means for generating a superheated vapor from said vapors generated in said vapor generating means;
   (h) a means associated with said superheating means for introducing superheated vapors generated in said superheat generator to said high-velocity generator; and,
   (i) a means for condensing vapors from the enclosure at least at a rate equal to their input.

3. A method for removing solvent vapors from a base material which comprises:
   (a) introducing the base material into a constricted zone relative to the surrounding atmosphere;
   (b) impinging a high-velocity jet stream of superheated vapor onto the base material;
   (c) removing the base material from said constricted zone into the surrounding atmosphere which is maintained at a temperature at least that equal to the boiling point of the liquid from which the vapors are generated; and,
   (d) finally removing the base material from the so-maintained atmosphere.

4. A method for removing and recovering solvent from a base material retaining the same which comprises the steps of:
   (a) heating the base material to about the solvent vaporization temperature;
   (b) impinging high-velocity superheated vapors of said solvent against said base material while maintaining said base material in a confined zone;
   (c) withdrawing said base material through a constricting and flared throat from said confined zone into a vaporous atmosphere which has a heat content greater than that required to vaporize the solvent; and,
   (d) withdrawing said base material from said atmosphere free of solvent or solvent vapors.

5. A method for removing solvent from a base material and recovering said solvent which comprises:
   (a) contacting said base material containing solvent with an atmosphere of vapors of said solvent for a period of time sufficient to raise the temperature of the base material above ambient temperature;
   (b) introducing said so-heated base material into a confined zone and directing superheated vapors of said solvent against said base material, said confined zone being of substantial venturi shape in cross section;
   (c) discharging said base material through the throat of said venturi into said vaporous atmosphere; and, finally
   (d) withdrawing the base material free of solvent from said atmosphere.

References Cited

UNITED STATES PATENTS

| | | | |
|---|---|---|---|
| 1,847,915 | 3/1932 | Bailey | 34—156 X |
| 2,682,116 | 6/1954 | Dungler | 34—23 |
| 2,698,201 | 12/1954 | Gillis | 34—160 X |
| 3,408,748 | 11/1968 | Dunn | 34—78 X |

CHARLES J. MYHRE, Primary Examiner

U.S. Cl. X.R.

34—78